United States Patent [19]

Turrini et al.

[11] Patent Number: 4,999,803
[45] Date of Patent: Mar. 12, 1991

[54] FLOATING POINT ARITHMETIC SYSTEM AND METHOD

[75] Inventors: Silvio Turrini, Trieste, Italy; Judson S. Leonard, Waban, Mass.; Norman P. Jouppi, Palo Alto, Calif.

[73] Assignee: Digital Equipment Corporation, Maynard, Mass.

[21] Appl. No.: 374,164

[22] Filed: Jun. 29, 1989

[51] Int. Cl.$^5$ .................................................. G06F 7/38
[52] U.S. Cl. ......................................................... 364/748
[58] Field of Search ............... 364/748, 715.04, 715.08

[56] References Cited

U.S. PATENT DOCUMENTS

| | | | |
|---|---|---|---|
| 3,697,734 | 10/1972 | Booth et al. | 235/164 |
| 3,814,925 | 6/1974 | Spannagel | 364/748 X |
| 4,229,801 | 10/1980 | Whipple | 364/748 |
| 4,295,203 | 10/1981 | Joyce | 364/748 |
| 4,308,589 | 12/1981 | Joyce et al. | 364/748 |
| 4,488,252 | 12/1984 | Vassar | 364/748 |
| 4,562,553 | 12/1985 | Mattedi et al. | 364/748 X |
| 4,639,887 | 1/1987 | Farmwald | 364/748 |
| 4,683,546 | 7/1987 | Boney | 364/748 |
| 4,719,589 | 1/1988 | Tanaka | 364/748 |
| 4,720,809 | 1/1988 | Taylor | 364/748 |
| 4,807,172 | 2/1989 | Nukiyama | 364/748 X |
| 4,811,272 | 3/1989 | Wolrich et al. | 364/748 X |

Primary Examiner—Dale M. Shaw
Assistant Examiner—Tan V. Mai
Attorney, Agent, or Firm—Flehr, Hohbach, Test, Albritton & Herbert

[57] ABSTRACT

System and method for reducing the processing time or latency of floating point arithmetic operations by eliminating the need to complement a negative result produced by a subtraction operation. Each of two numbers is subtracted from the other in simultaneous parallel subtraction operations to produce one answer which is positive and one answer which is negative. The answer which is positive is selected as the result of the operation.

4 Claims, 1 Drawing Sheet

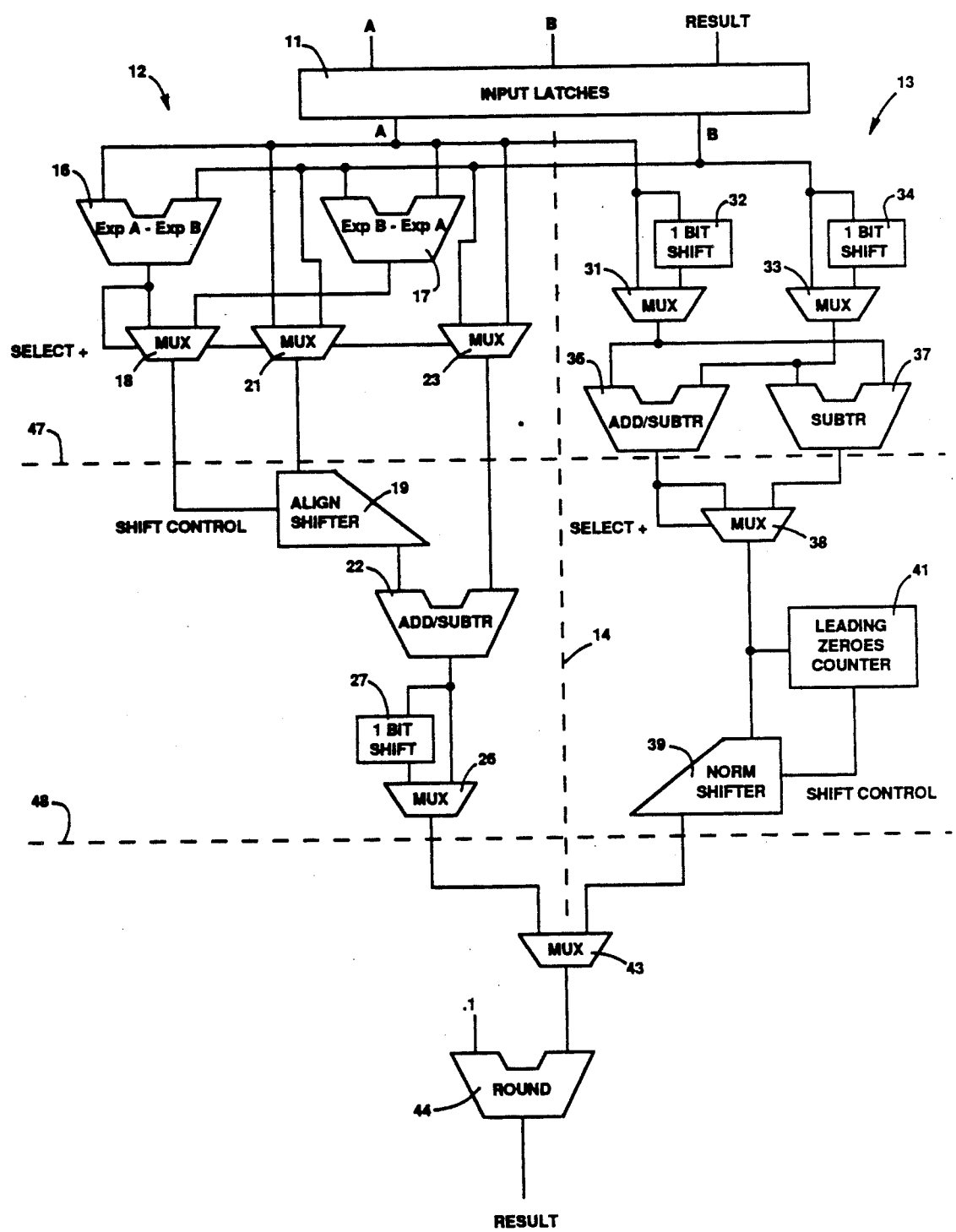

FLOATING POINT ARITHMETIC SYSTEM AND METHOD

BACKGROUND OF THE INVENTION

1. Field of the Invention

This invention pertains generally to digital computers and, more particularly, to a system and method for performing floating point operations in a digital computer.

2. Description of the Related Art

Floating point arithmetic is commonly employed in scientific and engineering computations in digital computers where high precision and large dynamic range are required. With floating point arithmetic, an operand or number is represented by a fraction which is called the mantissa, an exponent, and the sign of the mantissa. The mantissa is commonly written in a fixed point notation, e.g. one place to the left of the radix point, and the exponent is an integer which can be either positive or negative.

Depending upon the values of the operands, floating point addition and subtraction require some or all of the following steps: (1) calculation of the absolute value of the difference in the exponents of the two operands; (2) alignment of the two mantissas by shifting the mantissa of the smaller operand to the right by the number of places corresponding to the difference in the exponents; (3) addition or subtraction of the aligned mantissas; (4) two's complementing the difference if the difference is negative; (5) normalization of the sum or difference; (6) rounding of the normalized sum or difference; and (7) renormalization of the rounded sum or difference. At a minimum, an addition or subtraction operation generally requires alignment of the mantissas prior to the addition or subtraction step (prealignment), the addition or subtraction step itself, and normalization of the result of the addition or subtraction step (postnormalization). If the result of a subtraction is negative, then that result is complemented to provide a positive number which is normalized. The normalized result is then rounded and renormalized if the rounding has produced a carry from the most significant bit. Most of these steps involve propagation delays, which consume valuable processing time. The time elapsed from the beginning of one operation to the beginning an immediately following operation which is dependent on the first operation is referred to as the "latency" of the first operation, and latency is of critical importance in large, high speed arithmetic operations.

U.S. Pat. No. 4,639,887 describes a technique for improving the speed of a floating point addition or subtraction operation by breaking the three step process of prealignment, addition, and postnormalization into two parallel two step processes which are performed simultaneously in separate paths. This technique is based on the observation that depending upon the difference in the exponents of the operands, the addition or subtraction operation will consist essentially of either prealignment and addition or addition and postnormalization, but not both a large prealignment and a large postnormalization in the same operation. For an exponent difference greater than 1, postnormalization is eliminated, and the process consists essentially of prealignment and addition. For an exponent difference of 1 or less, prealignment is eliminated, and the process consists essentially of addition and postnormalization. Thus, the process in one path includes a prealignment shift of more than one place, addition, and a postnormalization shift of no more than one place, and the process in the other path includes a prealignment shift of no more than one place, addition, and a postnormalization shift of more than one place. Both of the processes are performed for each pair of operands even though only one of them will give a correct answer for any given pair, and the correct answer is selected as the result. Since only one large shift is required in each path, the overall processing time is significantly shorter than in the full three step process.

SUMMARY OF THE INVENTION

The invention further reduces the processing time or latency of floating point operations by eliminating the need to complement a negative result produced by a subtraction operation. This is done by simultaneously performing two parallel subtraction operations in which each of two numbers is subtracted from the other to produce one answer which is positive and one answer which is negative, and selecting the answer which is positive as the result of the operation.

BRIEF DESCRIPTION OF THE DRAWING

The single FIGURE of drawing is a functional block diagram of one embodiment of a system for performing floating point addition and subtraction in accordance with the invention.

DETAILED DESCRIPTION

The data format employed in one presently preferred embodiment is a 64-bit double-precision floating point G format in which one bit (bit 0) is assigned to the sign of the mantissa or fraction, 11 bits (bits 1–11) are assigned to the exponent, and 52 bits (bits 12–63) are assigned to the mantissa or fraction. In the G format, the actual mantissa or fraction is always assumed to be normalized, but the normalizing bit is not present in the physical representation, so there is, in effect, a hidden bit. If the exponent field is 0, the number is assumed to be 0 if the sign and mantissa fields are also 0, or a reserved operand if the sign bit is 1.

As illustrated in the drawing, the adder includes input latches 11 which receive operands A and B as data inputs, together with the result R from a previous operation in the adder. If either or both of the operands is dependent on the previous result, the previous result is passed through the latch for that operand. For convenience, the numbers at the outputs of the latches are also designated A and B, although one or both of the operands may have been adjusted by bypassing the previous result to the output.

The adder has two parallel data paths or pipelines 12, 13 which are separated by a vertically extending dashed line 14 in the drawing. In data path 12, numbers with exponents which differ by more than 1 are aligned and then added or subtracted. In data path 13, numbers with exponents which differ by no more than 1 are added or subtracted, and the sum or difference is normalized.

In data path 12, the exponents of the operands or numbers A and B from the input latches are applied to the inputs a pair of subtractors 16, 17, and the outputs of the subtractors are connected to the inputs of a multiplexer 18. Subtractor 16 calculates the difference Exp A—Exp B, and subtractor 17 calculates the difference Exp B—Exp A, where Exp A and Exp B are the exponents of the operands A and B, respectively. Depending on the relative sizes of the two exponents, one of the differences will be positive, and the other will be negative. The positive difference is selected by multiplexer 18 and applied to the shift control input of an alignment shifter 19.

The mantissa of the smaller of the operands A and B is applied to the data input of alignment shifter 19 by a multiplexer 21. Being controlled by the difference in the exponents, the shifter shifts the mantissa of the smaller number to the right by the number of places required to make the exponents of the two numbers equal.

The shifted mantissa from shifter 19 is applied to one input of an adder/subtractor 22, and the mantissa of the larger operand is applied to the second input of the adder/subtractor by a multiplexer 23. This adder/subtractor either adds or subtracts the aligned mantissas in accordance with the operation to be preformed.

The output of adder/subtractor 22 is applied to one input of a multiplexer 26 and to the input of a 1-bit shifter 27. The output of the 1-bit shifter is applied to the second input of multiplexer 26, and this circuit shifts the sum or difference from the adder/subtractor one place in the proper direction if normalization is necessary following the addition or subtraction operation. Since the numbers were aligned prior to the addition or subtraction operation, normalization of more than one bit is not necessary in this data path.

In data path 13, any alignment which may be required in the mantissas of the operands A and B is performed by a pair of circuits similar to the circuit which performs the 1-bit normalization in data path 12. Since the exponents of the numbers to be added or subtracted in data path 13 differ by no more than one, the numbers to be processed in this data path require either no alignment shift at all or a shift of only one place. Thus, the mantissa of operand A is applied to one input of a multiplexer 31 and to the input of a 1-bit shifter 32, and the mantissa of operand B is applied to one input of a multiplexer 33 and to the input of a 1-bit shifter 34, with the outputs of the 1-bit shifters being applied to the second inputs of the respective multiplexers.

The outputs of multiplexers 31, 33 are applied to the inputs of an adder/subtractor 36 and a subtractor 37. Depending upon the operation to be performed, adder/subtractor 36 performs either the addition Man A+Man B or the subtraction Man A−Man B, where Man A and Man B are the mantissas of the operands A and B, respectively. Subtractor 37 performs the subtraction Man B−Man A. The two subtractions are thus performed simultaneously in the two paths provided by the adder/subtractor 36 and the subtractor 37. The differences from the two subtractions will have the same magnitude, but depending upon the relative magnitudes of the two mantissas, one result will be positive and the other will be negative.

The sum or difference from adder/subtractor 36 and subtractor 37 are applied to the inputs of a multiplexer 38. For an operation of addition, the multiplexer passes the sum from adder/subtractor 36. For subtraction, the multiplexer selects the difference which is positive, and this eliminates the need to complement the result of the subtraction in the event that it is negative. This reduces the processing time or latency of the subtraction operation significantly by eliminating the propagation delay of the complementing step.

The output of multiplexer 38 is applied to the data input of a normalization shifter 39 and to the input of a counter 41 which counts the number of leading zeroes in the result of the addition or subtraction operation. The output of the leading zeroes counter is applied to the shift control input of the normalization shifter, and the result of the addition or subtraction is thus normalized by shifting it to the left by the number of places required to eliminate the leading zeroes.

The outputs of multiplexer 26 and normalization shifter 39 are applied to the inputs of a multiplexer 43 which selects the correct result from the two data paths or pipelines in accordance with the difference in the exponents of the operands, i.e. Exp A—Exp B or Exp B—Exp A. If the difference in the exponents is greater than 1, the correct result is in data path 12, and that result is passed by the multiplexer. If the difference in the exponents is 0 or 1, the correct result is in data path 13, and that result is passed by the multiplexer.

The output of multiplexer 43 is applied to an adder 44 which [adds 0.1 (binary) to the selected result to] effects rounding of the result. Renormalization is performed concurrently with the rounding to further reduce latency.

When pipelining is employed, the entire addition and subtraction process can be completed in three pipeline stages of four clock pulses each, and the division of the process into three pipeline stages is indicated by horizontally extending dashed lines 47, 48 in the drawing. In the first pipeline stage, the difference in the exponents is calculated in data path 12, and the addition or subtraction operation is performed in path 13. In the second pipeline stage, the mantissas are aligned and the addition or subtraction is performed in path 12, and the result of the addition or subtraction from the previous stage in path 13 is normalized in that path. In the third stage, the correct result is selected, and rounding and renormalization are performed.

Operation and use of the system shown in the drawing, and therein the method of the invention, can now be described. The difference in the exponents is calculated by subtractors 16, 17 and multiplexer 18, the addition or subtraction operation is performed simultaneously in the two data paths 12, 13, and the result from one of the data paths is selected in accordance with the difference in the exponents. In calculating the difference in the exponents, the subtractors subtract each of the exponents from the other, producing differences of equal magnitude but opposite sign. Multiplexer 18 selects the positive difference as the result of the subtraction, thereby avoiding the need to complement a negative result which might occur if the subtraction were performed in only one direction.

When the difference in the exponents is large (greater than 1), the answer produced by data path 12 is selected as the result of the calculation, and the answer produced by path 13 is ignored. In path 12, shifter 19 aligns the mantissas prior to the addition or subtraction step by shifting the mantissa of the smaller number to the right by the number of places which is equal to the difference in the exponents of the two numbers. Following the addition or subtraction operation, multiplexer 26 and shifter 27 either pass the sum or difference through without shifting or shift it by one place, which is the maximum shift required when the difference in the exponents is large and the numbers have been aligned prior to addition or subtraction.

When the difference in the exponents is small (no greater than 1), the answer produced by data path 13 is selected as the result of the calculation, and the answer produced by path 12 is ignored. With exponents which differ by no more than one bit, the maximum precalculation alignment which can be required is only one bit, and this is performed by multiplexers 31, 33 and shifters 32, 34.

In path 13, a distinction is made between addition and subtraction operations in order to avoid the need to complement a negative result in a subtraction operation. For addition, the aligned numbers from multiplexers 31, 33 are added together in adder/subtractor 36, and the sum produced by this operation is normalized by shifter 39.

A subtraction operation is performed simultaneously in adder/subtractor 36 and subtractor 37 to provide two differences of equal magnitude but opposite sign. In adder/subtractor 36, the mantissa of operand B is subtracted from the mantissa of operand A, and in subtractor 37, the mantissa of operand A is subtracted from the mantissa of operand B. The results of these two subtractions are equal in magnitude but opposite in sign, and the positive result is selected by multiplexer 38. This result is normalized by shifter 39.

For an operation on any two numbers, only one of the data paths 12, 13 gives the correct answer, and this answer is selected by multiplexer 43 in accordance with the difference in the exponents of the operands. For a difference greater than 1, the result of path 12 is selected, and for a difference of 0 or 1, the result of path 13 is selected. The selected result is rounded by adder 44 and renormalized, if necessary.

The invention has a number of important features and advantages. The need to complement a negative result of a subtraction operation is eliminated by simultaneously subtracting each of the two numbers to be subtracted from each other to produce one result which is positive and one result which is negative, and selecting the result which is positive. A similar technique is employed in calculating the difference in the exponents of the two operands, and this difference is utilized in aligning the numbers for addition or subtraction and in determining which of two parallel data paths is to be used for a given pair of operands.

It is apparent from the foregoing that a new and improved system and method for performing floating point arithmetic have been provided. While only certain presently preferred embodiments have been described in detail, as will be apparent to those familiar with the art, certain changes and modifications can be made without departing from the scope of the invention as defined by the following claims.

We claim:

1. In a system for performing floating point arithmetic with first and second numbers each having a mantissa and an exponent:
   a. means for comparing the exponents of the two numbers;
   b. a first data path having an alignment shifter for shifting the mantissa of one of the numbers by more than one place to provide numbers with aligned mantissas and equal exponents, an adder/subtractor for combining the aligned mantissas, and means for normalizing the output from the adder/subtractor by shifting its mantissa by no more than one place;
   c. a second data path having means for shifting the mantissa of one of the two numbers no more than one place to provide numbers with aligned mantissas and equal exponents, a pair of subtractors in parallel paths for simultaneously subtracting the mantissa of the first number from the mantissa of the second number and the mantissa of the second number from the mantissa of the first number to produce one result which is positive and one result which is negative, means for selecting the positive result, and means for normalizing the selected result by shifting its mantissa by more than one place; and
   d. means for selecting between the normalized results from the two data paths.

2. The system of claim 1 wherein the means for comparing the exponents includes means for simultaneously subtracting each of the exponents from the other to produce one result which is positive and one result which is negative, and means for selecting the positive result.

3. In a method of performing floating point arithmetic with first and second numbers each having a mantissa and an exponent, the steps of:
   a. comparing the exponents of the two numbers;
   b. simultaneously performing operations in first and second parallel data paths as follows:
      1. in the first data path: shifting the mantissa of one of the numbers by more than one place to provide aligned numbers with equal exponents if the difference in the exponents is greater than one, combining the mantissas of the aligned numbers in an adder/subtractor, and normalizing the output from the adder/subtractor by shifting its mantissa by no more than one place;
      2. in the second data path: shifting the mantissa of one of the two numbers no more than one place to provide aligned numbers with equal exponents if the difference in the exponents is no greater than one, simultaneously subtracting the mantissa of the first number from the mantissa of the second number and the mantissa of the second number from the mantissa of the first number to produce one result which is positive and one result which is negative, selecting the positive result, and normalizing the selected result by shifting its mantissa by more than one place; and
   c. selecting between the normalized results from the two data paths.

4. The method of claim 3 wherein the exponents are compared by simultaneously subtracting each of the exponents from the other to produce one result which is positive and one result which is negative, and selecting the positive result.

* * * * *